United States Patent Office 3,778,347
Patented Dec. 11, 1973

3,778,347
METHOD AND SYSTEM FOR OPERATING A BOILING WATER REACTOR-STEAM TURBINE PLANT PREFERABLY UNDER DIGITAL COMPUTER CONTROL
Theodore C. Giras, 336 Sharon Drive, Pittsburgh, Pa. 15221, and Leaman B. Podolsky, 714 W. 38th St., Wilmington, Del. 19802
Continuation of abandoned application Ser. No. 779,091, Nov. 26, 1968. This application Sept. 27, 1971, Ser. No. 184,157
Int. Cl. G21c 7/36
U.S. Cl. 176—24
21 Claims

ABSTRACT OF THE DISCLOSURE

A digital computer control system operates a boiling water nuclear reactor and a steam turbine in an electric power plant. The computer applies feedforward control to the reactor system and to the turbine inlet and bypass steam valves to meet plant load demand within throttle pressure constraints. The plant is operated by the computer in the turbine follow mode or the coordinated mode.

---

This is a continuation of application Ser. No. 779,091, filed Nov. 26, 1968, now abandoned.

CROSS REFERENCE TO RELATED APPLICATIONS (1) Ser. No. 779,075 entitled Improved System and Method for Operating a Boiling Water Reactor-Steam Turbine Plant, filed by L. B. Podolsky on Nov. 26, 1968 and assigned to the present assignee, now Pat. 3,630,839 dated Dec. 28, 1971.

(2) Ser. No. 722,779 entitled Improved System and Method for Operating a Steam Turbine and an Electric Power Generating Plant filed by T. C. Giras, and M. E. Birnbaum on Apr. 19, 1968 and assigned to the present assignee.

BACKGROUND OF THE INVENTION

The present invention relates to steam turbine plants and more particularly to electric power plants operated by steam turbines for which the steam supply is provided by a nuclear boiling water reactor.

In a boiling water nuclear reactor, the nuclear fuel is structured with a suitable geometry to provide for a sustained chain nuclear reaction as the coolant water passes through the fuel arrangement. Conventionally, the nuclear fuel is housed in elongated metallic tubes which are in turn assembled and supported in parallel arrays or bundles. The reactor core is formed from an assembly of the fuel bundles and it is housed in a large pressure vessel with provision for coolant flow along all of the fuel elements. Neutron absorbing control rods are supported within the core for movement relative to the fuel elements.

The design of the core and other reactor parameters determine the reactor power rating. Mechanical, nuclear, hydraulic and other details of the reactor design are the result of development programs aimed at achieving efficient performance for the plant owner.

Since water density is a large determinant of the rate of generation of slow neutrons which are required for the controlled propagation of the chain nuclear reaction, the power operating level of the reactor is partly determined by the accumulation of steam voids in the core volume. Increased coolant flow causes faster fuel rod cooling with reduced boiling and accordingly reduced void accumulation and higher reactor power. Decreased coolant flow has the opposite effects. Typically, coolant flow control can be used to control the boiling water reactor power level within a range of about 20% or 25% with a preset control rod placement.

The reactor generated steam is normally directed through separators and dryers within the pressure vessel, and the dry saturated steam is directly channeled at a pressure such as 1000 p.s.i. and a temperature such as 545° F. to the utilization equipment, i.e. the turbine generator unit(s) of the electric power plant. Separated water is combined in the pressure vessel with external and internal recirculation flows and with return and makeup feedwater flow.

Since the boiling water reactor plant is the direct cycle type and since outlet steam pressure and reactor vessel pressure affect the void accumulation in the reactor core, it is desirable to operate the turbine inlet valves to determine the turbine and generator load level subject to pressure regulating demands of the reactor. With reactor pressure maintenance within a relatively narrow pressure band such as about 30 p.s.i., reactor power level is controlled by coolant flow control within a limited range or by control rod movement if a different power range is required to meet load demand on the turbine generator unit(s).

In general, the steam turbine energization level is determined by the flow of the turbine inlet steam which in turn is determined by the steam conditions at the outlet of the steam source and by steam inlet valve positioning. The turbine drive power supplied for the plant generator(s) is desirably controlled to satisfy electrical load demand and frequency participation demand placed on the electric power plant by the plant operator or by an economic dispatch computer or by other means.

At substantially constant temperature throttle steam, turbine power is proportional to turbine steam flow, and if the throttle pressure is also substantially constant the steam flow is proportional to impulse chamber steam pressure or the ratio of the impulse chamber steam pressure to the throttle steam pressure. As already indicated, positioning of the inlet steam valving must provide for reactor vessel pressure regulation as well as turbine energization level control. When the boiling water reactor power level corresponds to the plant load demand, the turbine inlet valves are positioned to produce both the desired reactor vessel pressure and the turbine steam flow required for satisfying plant electrical load demand.

A steam bypass system is also usually provided to direct steam flow from the reactor outlet to the plant condenser under certain conditions. Steam bypass in effect provides an interface between the boiling water reactor and the steam turbine during reactor startup and shutdown and during other periods such as during load rejection. In these cases, steam supplied by the reactor but not needed by the turbine is channeled to the condenser under control imposed on the bypass system by the throttle pressure control system.

To control a boiling water reactor-steam turbine plant, it has been customary to use the turbine follow mode of operation. After plant startup, corrective changes are made in the reactor power level by automatic or manual reactor coolant flow control or by manual or possibly automatic control rod operation in order to satisfy plant load demand. Turbine throttle pressure is sensed and the turbine inlet steam valves are operated in the follow mode to control the throttle and reactor vessel pressures and enable turbine steam flow changes to be made to correct the turbine load as the reactor power level is being corrected. To speed up the control particularly when step changes are made in load demand, the setpoint of the turbine pressure control may be temporarily adjusted in response to the load error.

In the previously indicated Podolsky patent application, there is described another kind of control system for boiling water reactor-steam turbine plants. The Podolsky control is a coordinated control system which applies load demand directly to the turbine inlet valve controls as well as the reactor controls to produce better turbine and plant performance within throttle pressure constraints.

In the typical boiling water reactor-steam turbine application, the part of the control system directed to turbine valve control is principally mechanical and hyraulic in character with some electrical circuitry such as that involved in the throttle pressure sensing function. Examples of principally hydraulic turbine inlet valve feedback controls in nonnuclear applications are set forth in U.S. patents Bryant 2,552,401 and Marlsand 1,777,470. A principally mechanical turbine inlet valve feedback control is shown in U.S. patent Eggenberger 3,027,137 in a nonnuclear application. Electrohydraulic analog feedback type turbine inlet valve controls have been employed in nonnuclear turbine applications to achieve operational improvements, and examples of such controls are presented in U.S. patents Bryant 2,262,560, Herwald 2,512,154, Eggenberger 3,097,488, 3,097,489, 3,098,176 and Callan 3,097,490. Further details on conventional electrohydraulic controls in nonnuclear applications are presented in a paper entitled "Electrohydraulic Control for Improved Availability and Operation of Large Steam Turbines" and presented by M. Birnbaum and E. G. Noyes to the ASME-IEEE National Power Conference at Albany, N.Y. during Sept. 19–23, 1965.

In the copending Podolsky application, there is also disclosed a control system for boiling water reactor-steam turbine plants in which electrohydraulic controls are employed in both the turbine follow and the coordinated control schemes to produce better plant operation than that produced by the typical mechanical-hydraulic controls. In the aforementioned Giras and Birnbaum patent application, there is disclosed an electrohydraulic turbine control system which employs a programmed digital computer. The Giras and Birnbaum turbine control system employs feedforward control principles and it is arranged in the environment of a fossil fuel electric power plant where it provides improved turbine and electric plant operations. The feedforward turbine control is also described as being applicable within the framework of the disclosed general principles to provide improved turbine operation in other types of power plants and in applications other than electric power plant applications. A similar system employing general feedforward principles is described in a paper entitled "Digital Control for Large Steam Turbine-Generators" presented by T. C. Giras and M. Birnbaum to the American Power Conference during Apr. 23–25, 1968 in Chicago, Ill.

As indicated in the Podolsky patent application, the prior art has been characterized with operating shortcomings and other disadvantages in the area of boiling water reactor-steam turbine plants. Generally, the performance deficiencies have included deficiencies in plant response speed and the extent of plant or system coordination. These performance shortcomings have resulted in less security, less economy, and less efficiency than might otherwise have been realized. The coordination control philosophy embraced by the Podolsky disclosure differs from and represents an improvement over the prior art turbine follow philosophy. The present disclosure provides advantages including improvements in boiling water reactor-steam turbine plant control and plant performance in both the Podolsky coordinated plant control and the turbine follow plant control.

More specifically, in both the turbine follow and the coordinated plant controls, accuracy and flexibility of turbine and plant control is restricted by limited static characterization capability of the conventional electrohydraulic steam valve control circuitry. In order to control steam flow, turbine valve position demand is made a function of throttle pressure error in the turbine follow control and it is made a function of load demand and/or error and throttle pressure error in the coordinated control. Bypass valve position demand is typically made a function of throttle pressure error in both types of controls.

In all these prior art cases, an attempt is made to make the static characterization produced by the applicable valve position demand transfer function result in linear or other predetermined variation of turbine or bypass steam flow with respect to the error input(s). The analog control circuitry makes it difficult to achieve high accuracy static characterization and in any event is too inflexible to provide for convenient modification of a particular static characterization from control unit to control unit of production or in the same control unit after that unit has undergone use.

Dynamic characterization produced in the valve controls has similarly been lacking in capability, flexibility and accuracy and has thereby prevented faster plant control action where such action is otherwise within the reactor and turbine system response capabilities. For example, the typical turbine follow control system is limited to proportional control action in response to throttle pressure error. As a result, valve position control has been incapable of holding the throttle pressure substantially at zero error as reactor power level adjustments are made to satisfy load demand changes. Zero error throttle pressure control without integral windup may be desirable even though it would reduce the speed with which the plant system can meet changes in load demand.

With respect to reactor operations, known reactor controls in both plant control types are also limited in accuracy and flexibility and speed of response because of limited static and dynamic characterization capability. For example, reactor power level control actions have typically been based on feedback determined load error and speed of reactor control system response has thus been limited by reactor control system gain limitations.

Among other shortcomings, the prior art control systems have been inadequately coordinated with respect to transfer between various modes of operation such as from initial turbine loading to synchronous turbine follow operation. The Podolsky coordinated control can produce improvements in this area, but it is also desirable that some incremental coordination improvement be provided for turbine follow systems per se.

SUMMARY OF THE INVENTION

In accordance with the broad principles of the present invention, turbine and/or bypass valve position is determined on a feedforward basis to satisfy throttle pressure demand with improved dynamic response in a turbine follow type of boiling water reactor plant or to satisfy load demand with improved dynamic response in a coordinated type of boiling water reactor plant. In turbine follow operation, throttle pressure error trim is applied to the throttle pressure demand preferably by multiplication. Similarly, in coordinated control, load error trim and throttle pressure constraint are applied to the load demand preferably by multiplication. In both cases, trimmed feedforward operation is preferably also employed in determining the setpoint for the reactor power operating level. Preferably, a digital computer control system is employed in effecting feedforward operations with improved static and dynamic response and better flexibility. In the turbine follow system, the computer is preferably also employed in producing improved interfacing among the various plant operating modes for better plant coordination and better plant performance.

It is therefore an object of the invention to provide a novel system and/or method for controlling or operating a boiling water reactor-steam turbine plant with generally improved performance.

It is another object of the invention to provide a novel system and/or method for controlling or operating a boiling water reactor-steam turbine plant with improved flexibility and coordination.

It is a further object of the invention to provide a novel system and/or method for controlling or operating a boiling water reactor-steam turbine plant with improved static and/or dynamic response.

It is an additional object of the invention to provide a novel system and/or method for controlling or operating a boiling water reactor-steam turbine plant with improved accuracy.

Another object of the invention is to provide a novel system and/or method for controlling or operating a boiling water reactor-steam turbine plant with faster response capability.

A further object of the invention is to provide a novel system and/or method for controlling or operating a turbine follow type of boiling water reactor plant with improved coordination among the various modes of plant operation.

An additional object of the invention is to provide a novel system or method for controlling or operating a boiling water reactor-steam turbine plant with substantially zero error throttle pressure.

These and other objects of the invention will become more apparent upon consideration of the following detailed description along with the attached drawings.

DESCRIPTION OF THE PREFERRED EMBODIMENT

Figure 1:
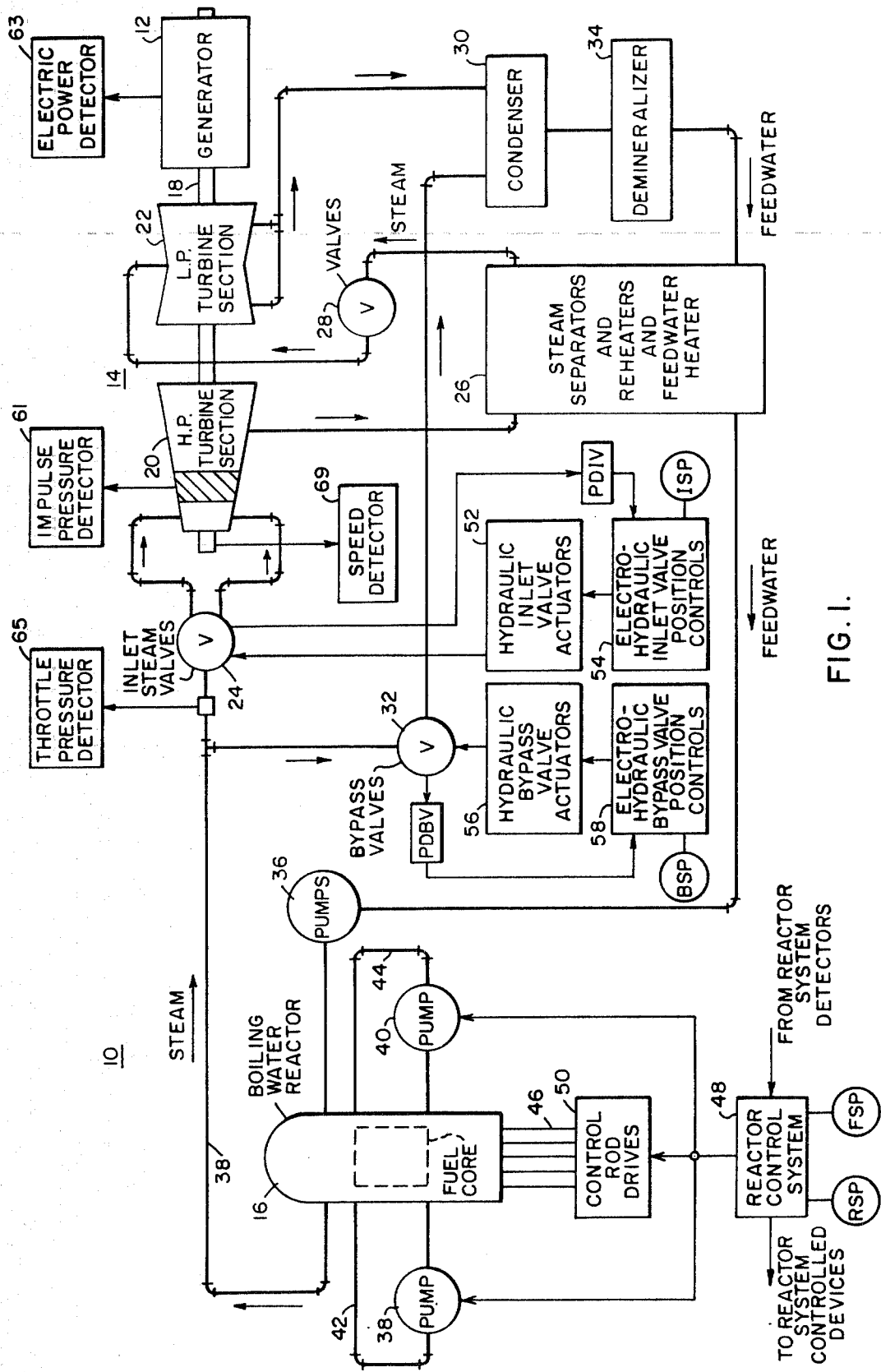
FIG. 1 shows a schematic diagram of an electric power plant operated by boiling water reactor and steam turbine apparatus.

More specifically, there is shown in FIG. 1 an electric power plant 10 which is provided with a conventional electric generator 12 operated by a nuclear steam turbine 14 in accordance with the principles of the invention. A steam generating system for the turbine 14 includes a conventional nuclear boiling water reactor 16.

The nuclear steam turbine 14 is provided with a single output shaft 18 which drives the generator 12 to produce three phase or other phase electric power. Typically, the electric generator 12 is connected (not shown) through line breakers to a large electric power network and when so connected causes the turbogenerator arrangement to operate at synchronous speed under steady-state conditions. Under transient electric load change conditions, system frequency may be affected and conforming turbogenerator speed changes would result. At synchronism, power contribution of the generator 12 to the network is normally determined by the turbine steam flow and the throttle pressure at which that flow is supplied by the boiling water reactor 16.

In this instance, the nuclear steam turbine 14 is of the multistage axial flow type and includes a high pressure section 20 and a double flow low pressure section 22. Each of the turbine sections 20 and 22 may include a plurality of expansion stages provided by stationary vanes and an interacting bladed rotor connected to the shaft 18. In other applications, nuclear steam turbines operated in accordance with the present invention can have other forms with more or fewer sections tandemly connected to one shaft or compoundly coupled to more than one shaft. For example, as many as three or more low pressure sections might be employed, and each section could have single flow or double or other plural flow paths.

Steam is directed to the nuclear turbine 14 through conventional inlet steam valves 24. Typically, the valves 24 would include two or more throttle valves (not specifically indicated) which admit steam to the turbine steam chest (not indicated) and a plurality of up to 4 or more governor control valves (not specifically indicated) which are arranged to supply steam to turbine inlets arcuately spaced about the turbine high pressure casing.

The conventional nuclear turbine startup method is employed. Thus, the turbine speed is raised from the turning gear speed of about 2 r.p.m. to the synchronous speed under throttle or governor valve control. Then, the power system breaker(s) is closed and the governor valves are operated to meet the load demand. On shutdown, similar but reverse practices can be employed or conventional coastdown procedure can be used. In the load control mode, plant electrical load demand is met when the steam flow and throttle pressure conditions cause the turbine energization level to correspond to the plant electrical demand.

The total turbine energization is produced by steam flow through the high pressure section 20 and by steam flow through the low pressure section 22. Steam flow between the two turbine sections is directed through steam separators and reheaters as indicated by block 26 in order to raise the steam enthalpy level to a more efficient value. Stop valve(s) are included in the inter-section steam flow path to stop steam flow when necessary for turbine overspeed protection.

Vitiated steam from the low pressure turbine section 22 is directed to a condenser 30. Reactor feedwater flow from the condenser 30 includes any makeup water flow and the flow resulting from condensation of the vitiated turbine steam as well as that resulting from condensation of the steam which is controllably diverted from the turbine 14 through by pass valves 32 directly to the condenser 30.

The feedwater flow is directed from the condenser 30 to a demineralizer 34 where corrosion products and other impurities are removed from the fluid. From the demineralizer 34, the feed water is driven by one or more feedwater pumps 36 through a feedwater heater system indicated in the block 26 and into the pressure vessel of the nuclear boiling water reactor 16.

In the reactor 16, heat produced in the fuel rods contained within the fuel core is transferred to the coolant which flows along the rods. Steam is collected at the top of the pressure vessel and directed through one or more conduits to the turbine inlet valves 24 as indicated by the reference character 38. Since the steam produced by the reactor 16 is used directly for turbine energization, the plant operation is characterized as being of the single or direct cycle type.

Generally, it is necessary to hold the reactor vessel pressure within a relatively narrow range because the vessel pressure affects the reactivity rate and the reactor power operating level, i.e. the power level varies directly with the reactor pressure. Accordingly, it is necessary that the turbine throttle pressure be held within a relatively narrow range or if desired and if possible at the rated value by the imposition of throttle pressure control on the turbine inlet valve operation. Since turbine load is proportional to turbine steam flow or the ratio of impulse chamber pressure to throttle pressure (with the throttle steam at substantially constant pressure and temperature), turbine inlet valve control cannot satisfy load demand changes in the steady state unless changes are made in the steam generation rate at the steam source.

To enable turbine steam flow changes to be made to satisfy turbine and plant loading demand within the throttle pressure operating range, the reactor power operating level is changed as by changing the reactor core recirculation flow through controlled operation of centrifugal pumps 38 and 40 in recirculation flow loops 42 and 44. Jet pumps (not shown) can be used within the reactor vessel to produce a drive flow which forces coolant recirculation through and about the fuel core.

When it is desired to increase reactor power, steam void accumulation is reduced by increasing recirculation flow. Reduced reactor power requires reduced recirculation flow. Typically recirculation flow control can be used to vary reactor power over a range as high as 25% or more.

Larger power changes require position changes in conventional control rods 46 to vary the amount of neutron absorption. Manual or possibly automatic control rod placement would normally also be subject to implementation of a core burnup management program.

A conventional reactor control system designated by block 48 is provided for determining the operation of the recirculation flow system and the operation of the control rods 46. Feedback signals or data are applied to the reactor control system 48 from predetermined reactor system detectors and manually or automatically operated analog controllers or other suitable control means in the reactor control system 48 generate outputs which correctively operate the recirculation flow pumps 38 and 40, drives 50 for the control rods 46 and other reactor system controlled devices.

In the recirculation flow control system, conventional coolant flow detectors (not shown) can be used to determine the flows in the loops 42 and 44 for feedback comparison to a computer determined recirculation flow setpoint FSP. Similarly, suitable position detectors generate control rod position feed-back signals for comparison with control position setpoints RSP which are determined in accordance with the externally determined core management program and, if desired, in accordance with any demand for reactor power change in excess of the recirculation flow control range. In this case, automatically operated pump controllers vary the speed of the recirculation pump drives for flow correction and manually operated rod drive controlelrs are used to operate the rod drives to satisfy the rod position setppoints RSP.

Positioning of the respective turbine throttle and governor inlet valves is effected by operation of respective conventional hydraulic actuators 52 under the control of respective electrohydraulic position controls 54. Respective inlet valve position demand setpoint signals ISP are applied to the respective controls 54 under programmed computer control. Respective inlet valve position feedback signals PDIV are generated by respective linear differential transformer or other position detectors. Position error for any of the inlet valves 24 results in operation of the associated valve actuator 52 until the error is removed and the valve position demand ISP is satisfied.

Similarly, hydraulic bypass valve actuators 56 and electrohydraulic bypass valve position controls 58 operate the bypass valves 32 to satisfy respective bypass valve position demand setpoint signals BSP which are determined by programmed computer operation. The bypass valves 32 provide for diverting steam not needed by the turbine 14 such as during startup and shutdown and during load control when load rejection conditions are imposed on the power plant 10. Bypass valve position feedback signals PDBV are generated by a conventional position detectors for comparison to the individual setpoint signals BSP.

Each of the electrohydraulic position controls 54 or 58 includes a conventional analog controller (not indicated) which drives a suitable known actuator servo valve (not indicated) in the well known manner. In turn, the respective servo valves determine the operation of the valve actuators 52 and 56.

The reheat valves 28 are also controlled by a suitable hydraulically operated actuator (not indicated). A high pressure fluid supply system (not indicated in FIG. 1) provides the controlling fluid for operation of all of the hydraulic valve actuators. A lubricating oil system (not indicated in FIG. 1) is separately provided for turbine and other lubricating requirements. Both the high pressure fluid supply and the lubricating oil system can be placed under computer sequencing, monitoring and supervisory control.

In the present case, local loop analog electrohydraulic position control is preferred primarily because of the combined effects of control computer operating speed capabilities and computer hardware economics, i.e. the cost of manual backup analog control is less than that for backup computer capacity at present control computer operating speeds for particular applications so far developed. Shortly, however, economic and fast operating backup control computer capability is expected and direct digital computer control of the bypass and turbine inlet hydraulic valve actuators will then be preferred over the digital control of the local analog controls described herein.

Figure 2:
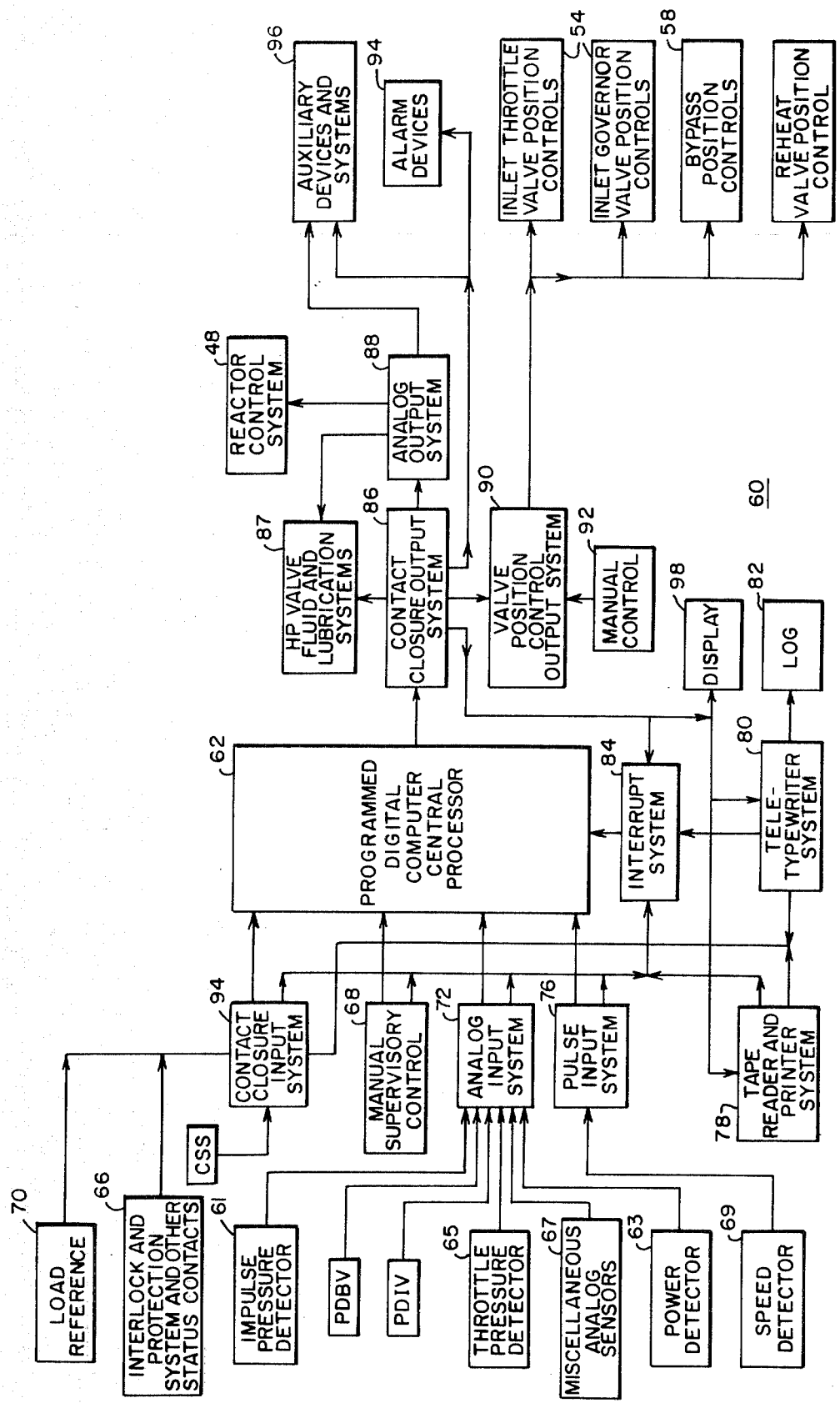
FIG. 2 shows schematic diagram of a digital computer control system arranged in accordance with the principles of the invention to operate the plant of FIG. 1.

As illustrated in FIG. 2, a programmed digital computer control system 60 is provided for operating the boiling water reactor 16 and the steam turbine 14 with improved plant operation in either the turbine follow mode or the coordinated control mode. It can include conventional hardware in the form of a central processor 62 and associated input/output interfacing equipment such as that sold by Westinghouse Electric Corporation under the trade name Prodac 50 (P50). In cases requiring greater computer capacity, use can be made of a larger computer system such as that sold by Westinghouse Electric Corporation and known as the Prodac 250 with or without separate smaller computers such as the P50 computers. In the case of multiple computers, control process interaction is achieved by tieing the separate computers together through data links and/or other means.

The P250 typically uses an integral magnetic core 16,000 word (16 bit plus parity) memory with 900 nanosecond cycle time, and external magnetic core 12,000 word or more (16 bit plus parity) memory with 1.1 microsecond cycle time and a mass 375,000 word or more (16 bit plus parity) random access disc memory unit. The P50 processor typically uses an integral magnetic core 12,000 word (14 bit) memory with 4.5 microsecond cycle time.

The interfacing equipment for the computer processor 62 includes a conventional contact closure input system 64 which scans contact or other similar signals representing the status of various plant and equipment conditions. Such contacts (not specifically indicated) are generally indicated by the reference character 66 and may include contacts associated with the plant steam valves and pumps and various other devices in the reactor and turbine systems. The status contacts might typically be contacts of mercury wetted relays (not shown) which are operated by energization circuit (not shown) capable of sensing the predetermined conditions associated with the various system devices. Status contact data is used in interlock logic functioning in control or other programs, protection and alarm system functioning, programmed monitoring and logging and demand logging, functioning of a computer executed manual supervisory control 68, etc.

The contact closure input system 64 also accepts digital load reference signals as indicated by the reference character 70. The load reference 70 can be manually set or it can be automatically supplied as by an economic dispatch computer (not shown). In the load control mode of operation, the load reference 70 defines the desired megawatt generating level and the computer control system 60 operates the turbine 14 and the reactor 16 to supply the power generation demand.

Input interfacing is also provided by a conventional analog input system 72 which samples analog signals from the plant 12 at a predetermined rate such as fifteen points per second for each analog channel input and converts the signal samples to digital values for computer entry. The analog signals are generated by a turbine impulse pressure detector 61 (FIGS. 1 and 2), an electric power detector 63, the valve position detectors, a throttle pressure detector 65 and miscellaneous analog sensors 67 such as various steam flow detectors, various steam temperature detectors, miscellaneous equipment operating temperature detectors, generator hydrogen coolant pressure and temperature detectors, etc. A conventional pulse input system 76 provides for computer entry of pulse type detector signals such as those generated by a speed detector 69. The computer counterparts of the analog and pulse input signals are used in control program execution, protection and alarm system functioning, programmed and demand logging, etc.

Information input and output devices provide for computer entry and output of coded and noncoded information. These devices include a conventional tape reader and printer system 78 which is used for various purposes including for example program entry into the central processor core memory. A conventional teletypewriter system 80 is also provided and it is used for purposes including for example logging printouts as indicated by the reference character 82.

A conventional interrupt system 84 is provided with suitable hardware and circuitry for controlling the input and output transfer of information between the computer processor 62 and the slower input/output equipment. Thus, an interrupt signal is applied to the processor 62 when an input is ready for entry or when an output transfer has been completed. In general, the central processor 62 acts on interrupts in accordance with a conventional executive program. In some cases, particular interrupts are acknowledged and operated upon without executive priority limitations.

Output interfacing is provided for the computer by means of a conventional contact closure output system 86 which operates in conjunction with a conventional analog output system 88 and with a valve position control output system 90. A suitable manual control 92 is coupled to the valve position control output system and is operable therewith to provide manual turbine and bypass valve control during computer shutdown and as desired during other time periods.

Certain computer contact outputs are applied directly in effecting program determined control actions of equipment including the high pressure valve actuating fluid and lubrication systems as indicated by the reference character 87, alarm devices 94 such as buzzers and displays, and predetermined plant auxiliary devices and systems 96 such as the generator hydrogen coolant system. Computer contact outputs are similarly applied directly to the tape printer and the teletypewriter system 80 and display devices 98.

Other computer digital outputs are first converted to analog signals through functioning of the analog output system 88 and the valve position control output system 90. The analog signals are then applied to the reactor control system 48, the auxiliary devices and systems 96, the fluid and lubrication systems 87, the steam valve controls 54 and 58 and other predetermined systems in effecting program determined control actions. The respective signals applied to the steam valve controls 54 and 58 are the valve position setpoint signals ISP and BSP to which reference has previously been made. Position setpoint computation for reheat valving control would typically only be required when at least some of the reheat valves 28 are to be backed off from the full open position for modulated reheat steam flow cutback.

A plant control programming system is employed to operate the computer system 60. It includes control and related programs as well as certain conventional housekeeping programs directed to internal control of the functioning of the computer system itself. The latter include the following:

(1) Priority Executive Program—Controls the use of the processor circuitry. In general, it does so on the basis of priority classification of all of the control and housekeeping programs and some of the various kinds of interrupts. The highest bidding program or interrupt routine is determined and allowed to run when a change is to be made in the programmed instructions undergoing execution. Some interrupt routines run outside the priority structure as already indicated, particularly where safety and/or expensive equipment protection are involved.

(2) Analog Scan—Periodic execution for the entry of predetermined analog inputs which have been converted by the analog input system 72 and stored in the analog input system buffer register.

(3) Status Contact Scan—Periodic execution for the entry of predetermined status contact inputs.

(4) Programmers Entry Program—Demand execution allows the computer operator to enter information into the computer memory.

(5) Diagnostic Routine—Executed upon computer system malfunction interrupt.

The programming system control and related programs are arranged to operate the plant 10 in either the turbine follow mode or the coordinated control mode. These programs include the following:

(1) Data Logging—Periodic or demand execution for print-out of predetermined events and parameter values.

(2) Alarm—Periodic and process interrupt execution for operating the alarm devices 94 and other system devices and for supervising and/or disabling the turbine and reactor and other control programs.

(3) Display—Periodic and demand execution for visual display (alphanumeric or graphic) of predetermined parameter values and/or trends.

(4) HP Valve Fluid Program—Periodic execution for supervisory control.

(5) Lubrication System Program—Periodic execution for supervisory control.

(6) Auxiliary Devices and Systems Programs—Periodic execution for supervisory control.

(7) Turbine Control Program—Periodic execution for control purposes.

(8) Reactor Control Program—Demand or periodic execution for control purposes.

(9) Bypass Valve Control Program—Demand or periodic execution for control purposes.

Figure 3:
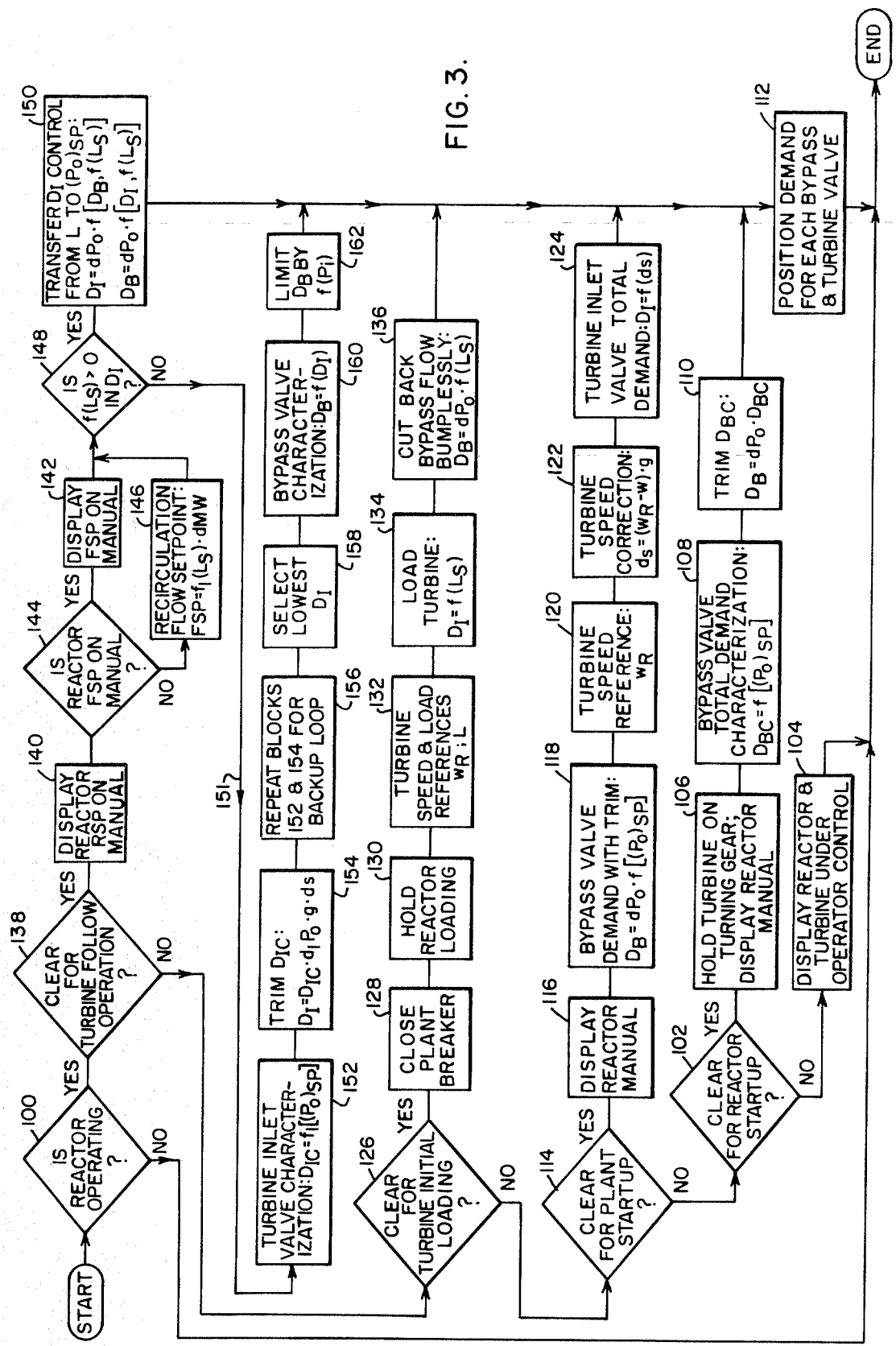
FIG. 3 shows a control logic flow diagram employed in part of a programming system which operates the computer system of FIG. 2 and the plant of FIG. 1 in the turbine follow operating mode in accordance with the principles of the invention.
Figure 4:
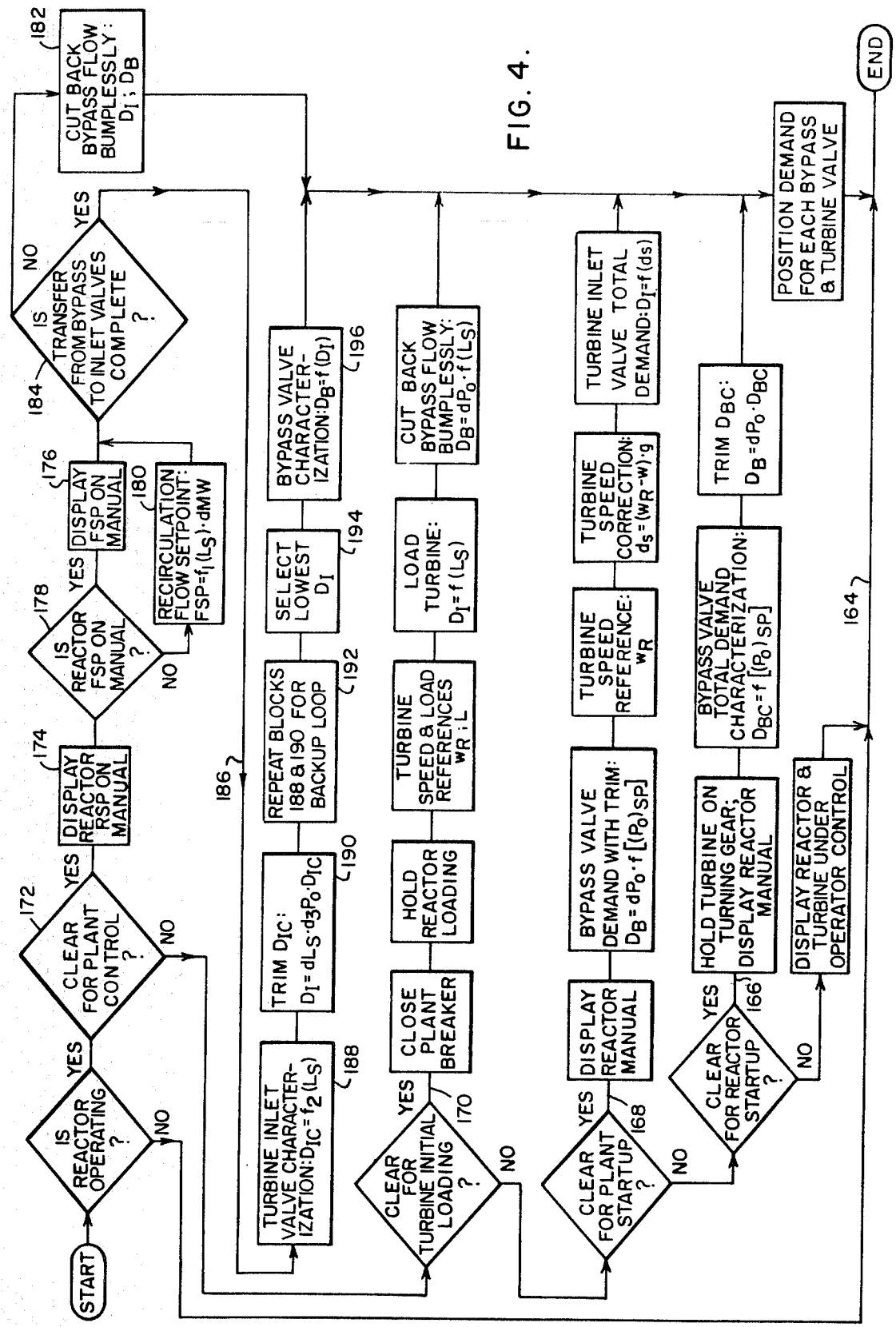
FIG. 4 shows a control logic flow diagram employed in part of a programming system which operates the computer system of FIG. 2 and the plant of FIG. 1 in the coordinated control mode in accordance with the principles of the invention.

The present invention primarily involves the functioning of the reactor, turbine and bypass valve control programs and further specific programming system description herein will accordingly be limited to it in both the turbine follow and the coordinated control embodiments of the invention. Reference is made to FIGS. 3 and 4 where respective flow charts including certain algorithms are shown as a representation of the basic logic content of these control programs in respective embodiments of the invention. Actual programs entered into the computer system 60 are coded in machine language from more detailed flow charts which are in turn derived from the illustrated flow charts.

In FIG. 3, there is represented the logic flow for the more significant parts of the control programming employed in the embodiment involving turbine follow plant operation. This logic flow involves the turbine reactor and bypass valve control programs. When the computer is programmed to interact with the plant apparatus in accordance with this embodiment of the invention, improved plant operation is realized over that realized in conventional boiling water reactor plants operated under turbine follow control.

After the computer system 60 has been energized, the programming system begins to function. Upon the start of execution of the turbine control program, the operational state of the reactor is determined in block 100. If the reactor 16 is shut down, the program is ended. If the reactor 16 is operating but not cleared by block 102 for startup nor by other clear blocks subsequently described in connection with other modes of operation, the fact that the reactor 16 and/or the turbine 14 are under operator control is caused to be displayed by block 104.

When the block 102 provides a clear decision, i.e. when a no latch turbine signal is available and any other required interlock functions have been satisfied, the turbine inlet valves 24 are continued in a closed state and the turbine 14 is held at turning gear speed by block 106. As the reactor operator raises the reactor operating level by manual control in the reactor startup mode, total bypass valve position demand $D_{BC}$ is determined by a bypass valve control program block 108 as a linearly characterizing function of the throttle pressure setpoint $(P_O)_{SP}$ on a feedforward basis. The stored bypass valve position demand characterization is originally determined from actual bypass valve positioning required to produce linearly bypass steam flow needed in turn to satisfy successively higher throttle pressure setpoints during actual and/or simulated reactor startups. Preferably, the throttle pressure setpoint is increased during the reactor startup toward a rated value along a ramp preselected from a number of computer stored ramps, but it can be computed on line as a function of reactor and other parameters if so desired. The fixed ramp values might vary from 1 p.s.i.g./sec. to 10 p.s.i.g./sec.

Actual throttle pressure is determined by the pressure detector 65 and it is subtracted from the pressure setpoint $(P_O)_{SP}$ in block 110 to produce a throttle pressure error determination $\Delta P_O$. The throttle pressure error $\Delta P_O$ is integrated as a function of time and multiplied by a constant gain K to generate a throttle pressure correction $dP_O$. The feedforward bypass valve demand $D_{BC}$ is modified by feedback trim through multiplication against the throttle pressure correction $dP_O$ which in this instance is applied in the form of a percentage multiplier. Block 112 then determines the individual bypass valve position demands required to satisfy the total demand $D_B$ in accordance with a predetermined sequencing operation. Faster and more accurate bypass valve operation results from faster functioning enabled by the feedforward bypass valve control loop. More accurate and more flexible bypass valve position demand characterization is enabled by the digital computer capability.

When the reactor startup mode has been completed, i.e. when adequate steam conditions have been developed, block 114 initiates the plant startup mode of operation if a turbine latch signal and breaker open signal are available and any other interlock functions are satisfied. Block 116 continues the display of manual reactor operation. The preselected throttle pressure ramp is continued toward the rated throttle pressure setpoint value and trimmed total bypass valve position demand $D_B$ is determined in block 118 in a manner similar to that described in blocks 108 and 110.

Plant startup involves using a relatively small amount of steam flow to accelerate the turbine from turning gear speed toward the synchronous speed value. A speed reference $w_R$ is thus determined in block 120 and a speed correction $ds$ is determined as a percentage quantity in block 122 by subtracting the actual turbine speed $w$ from the reference speed $w_R$ and multiplying the result by a speed feedback control loop gain $g$. In the next block 124, total turbine inlet valve position demand $D_I$ is determined by a characterization function which defines inlet valve position changes required to satisfy linearly the speed correction demand $ds$ as the turbine accelerates. Individual bypass and inlet valve position demands are determined in block 112. As in typical nuclear turbine applications, the turbine throttle valves are held wide open and the governor valves are used for full range control without arc transfer.

The speed reference $w_R$ in this case is a predetermined ramp function. In other cases, it may be a quantity determined on line on the basis of turbine rotor stress constraint control. Further elaboration on the latter type of speed control is beyond the scope of this writeup.

Although not illustrated in FIG. 3, turbine shutdown can follow the reverse of the closed loop control startup procedure. On the other hand, conventional coastdown procedure can be implemented in conjunction with appropriate bypass valve control.

When the turbine reaches synchronous speed and when the throttle pressure setpoint $(P_O)_{SP}$ has reached the fixed rated value or the reactor has reached a predetermined generation level such as 10% of rated flow and when other interlock clearance is available, the control system initiates the initial loading mode of operation through block 126. Closure of the plant breaker is effected by block 128 at the appropriate time point with reference to the network electrical waveform. To avoid motoring of the generator 12, the initial loading mode is withheld unless the plant conditions including a reactor load permissive provide a capability of supplying a minimum of 5% of rated load. Block 130 in the reactor control program (not represented in detail in FIG. 3) holds the present reactor loading or it may display this command for manual execution by the reactor operator.

In block 132, a plant load reference L is determined from a stored ramp function, but it may be a constraint value computed on line as a function of rotor thermal stress in a manner similar to that previously indicated for the determination of the speed reference $w_R$ in the block 120. The speed reference $w_R$ is also determined in the block 132 during initial loading and the speed correction $ds$ is determined as in the block 122. Gain $g$ in this instance represents the frequency participation duty assigned to the plant 10 by the plant operator or by a central computer (not shown). Thus, during synchronous turbo-generator operation, the generator 12 is caused to participate in network electrical load changes to a predetermined percentage extent.

In determining the turbine inlet valve position demand $D_I$ in block 134, a feedforward characterization is employed to produce better static and dynamic system performance during initial loading. The position demand $D_I$ is defined as a stored linearizing characterization function of the presently determined frequency trimmed load reference $L_S$ which equals $L \cdot g \cdot ds$. As in the case of the bypass characterization in the block 108, the turbine load characterization in the block 134 is originally derived from actual turbine inlet valve positioning required to produce linearly the turbine steam flow needed for successively higher load values. Bumpless turbine operation is produced by smooth programmed takeup of any difference between $f(ds)$ in the block 124 and $f(L_S)$ in the block 134 at the mode transfer timepoint.

As the turbine 14 is being loaded with increasing steam flow at constant reactor power level, accurate and fast bumpless system operation is further effected through bumpless cutback in bypass steam flow. Block 136 in the bypass flow control program defines the bypass valve position demand $D_B$ as a feedforward linearizing characterization function of the frequency trimmed load reference $L_S$ trimmed by the throttle pressure correction $dP_O$. The percentage quantity $dP_O$ is determined in a manner similar to that described in connection with the block 110. Bumpless bypass valve position demand results from making $f(L_S)$ in the block 136 equal to the value of $D_B$ in the block 118 at the mode transfer timepoint.

As previously, the block 112 functions in the initial loading mode to define the individual bypass valve position demands and the individual turbine inlet (governor) valve position demands. Since the turbine 14 is operated in the partial arc mode, suitable sequencing logic determines the sharing of the total position demand among the turbine governor valves.

After the bypass flow has been cut back to about 10% of the maximum bypass flow and any other required interlock functions have been satisfied, the initial loading mode is terminated and the system is cleared by block 138 for reactor load control with turbine follow operation. The fact that reactor control rod positioning is under manual control is displayed as a result of execution of block 140. Similarly, block 142 provides for displaying the fact that reactor flow control is under manual control if such control has been selected as detected by block 144.

If, as in the present case, the reactor flow control is under automatic operation, block 146 in the reactor control program determines the total reactor flow setpoint FSP by multiplying a load correction trim $dMW$ against a stored feedforward characterization function of the frequency trimmed load $L_S$. The feedforward function $f(L_S)$ which defines FSP is derived from reactor operating data which defines the flow levels required to produce various power levels at various control rod positions. The percentage quantity $g \cdot ds$ in the term $L_S$ is determined as previously described, and the quantity $dMW$ is determined as a percentage multiplier by comparing the frequency trimmed plant load demand $L_S$ to actual megawatts MW detected by the sensor 63, integrating the difference $(L_S-MW)$ and multiplying by gain $g_L$. The resultant load feedback trim has adequate response time to provide for steady state correction of any plant load error resulting from application of the feedforward reactor flow setpoint function.

As the system is being transferred bumplessly to turbine follow operation, the bypass flow is cut to zero and the function $f(L_S)$ is ramped to zero to transfer the governor valves from load control to throttle pressure control. Block 148 determines whether $f(L_S)$ is greater than zero in the equation for computing inlet valve demand $D_I$. If it is, block 150 is executed to determine the total turbine inlet valve demand $D_I$ and the total bypass valve demand $D_B$.

The turbine governor valve demand $D_I$ smoothly picks up decreasing bypass valve demand $D_B$ as the load demand $f(L_S)$ is brought to zero. To produce this transfer, $D_I$ is made equal to a predetermined feedforward function of $f(L_S)$ and $D_B$, and that function is feedback trimmed by multiplication against the throttle pressure correction $dP_O$. Simultaneously, $D_B$ is characterized as a feedback trimmed function of the decreasing load reference function $f(L_S)$ and turbine demand $D_I$. The bypass feedback trim is provided by the throttle pressure correction multiplier $dP_O$. Block 112 then develops individual turbine and bypass valve demands as previously described.

When the function $f(L_S)$ reaches zero value, the bypass demand $D_B$ is zero in the block 150, and throttle pressure control is then primarily executed by turbine valve operation. Block 148 accordingly directs each program execution into path 151 which provides for the turbine follow mode of operation. As a result of the control system interaction with the apparatus, improved coordination is achieved in moving the plant through the various operating steps incident to arriving at turbine follow operation.

In the turbine follow mode, governor valve positioning is used to hold throttle pressure substantially at rated value or within an allowed range of values as the reactor power operating level is varied by the operation of block 142 or 146 to meet plant load demand. The turbine loading thus follows the reactor power level to meet plant load demand as throttle pressure is regulated. Bypass valve operation handles pressure regulation outside the predetermined range of turbine regulation.

Block 152 in the turbine control program provides for determining turbine valve position demand $D_{IC}$ as a feedforward linearizing characterization function of throttle pressure setpoint $(P_O)_{SP}$. At crossover, $f(L_S)$ equals zero and $f_1[D_B,0]$ equals $f_1[(P_O)_{SP}]$ to produce the bumpless operation. Thereafter, $D_{IC}$ is constant as long as the throttle pressure setpoint is held constant and turbine follow operation results from feedback multiplier trim of $D_{IC}$ in block 154 by $d_1P_O$ which causes valve position demand to produce turbine steam flow in follow relation to reactor loading under throttle pressure constraint. To determine the feedback trim correction $d_1P_O$ in the block 154, the quantity $dP_O$ is generally determined in the manner described in connection with the block 110. However, the setpoint term $(P_O)_{SP}$ is first adjusted in accordance with a predetermined transfer function of the error in the speed trimmed load $(L_S-MW)$. This provides for reduced delay in plant response to changes in load demand. If desired, the determinations of $dP_O$ in the block 154 and in previously described blocks and $d_1P_O$ in the block 154 can include a proportional term as well as the described reset term. More generally, dynamic characterizations of various types can be flexibly preselected as determinants of the intermediate variables $dP_O$ and $d_1P_O$ as well as other intermediate and end controlled variables involved in the control system functioning.

During turbine follow operation, the demand $D_{IC}$ is further trimmed in the block 154 by the frequency participation factor $g \cdot ds$ which is determined in the manner previously considered. The turbine valve position demand resulting from the frequency and throttle pressure trim is $D_I$.

In block 156, the determinations made in blocks 152 and 154 with the use of output from throttle pressure detector 65 are repeated in a backup throttle pressure control branch which utilizes the output of another on line throttle pressure detector (not shown). Block 158 then selects the lowest demand $D_I$ from the blocks 154 and 156. A similar backup determination is made for bypass valve demand in each of blocks 108, 118 and 136 (not specifically indicated) prior to turbine follow operation. As in other cases, integral windup in the backup loops is prevented by programmed limits on the integral algorithm.

When the turbine governor valves lack capability to correct developing throttle pressure error, such as during load rejection periods, the bypass valves are brought into operation. Block 160 in the bypass valve control program thus determines the bypass valve demand $D_B$ as a predetermined linearizing characterization function of the turbine valve demand $D_I$ determined in the block 158. The function $f(D_I)$ in the block 160 is the same as the function $f[D_I,f(L_S)]$ in the block 150 when $f(L)$ reaches zero value at the bumpless mode crossover point. Typically, the function $f(D_I)$ would simply be a ramp type curve rising with positive slop from an abscissa intersect at a predetermined $D_I$ value. Block 162 limits the bypass valve demand in order to limit total reactor steam flow. As previously, the block 112 defines individual turbine and bypass valve demands during turbine follow operation.

As a result of the turbine follow control system functioning, better turbine follow plant coordination is realized particularly among the various modes of operation. Better accuracy and better plant dynamics are derived from the implementation of feedforward control principles. Better accuracy and flexibility of control results from computer system functioning. Throttle pressure regulation can, if desired, be made to provide for substantially constant throttle pressure through the reset action of the block 154, subject only to pressure setpoint adjust action in the block 154.

In FIG. 4, there is represented the logic flow for the more significant parts of the control programming employed in the embodiment involving coordinated control plant operation. When the computer is programmed to interact with the plant apparatus in accordance with this embodiment of the invention, improved plant operation is realized over that realized in previously known boiling water reactor plants operated under coordinated control as well as that realized in turbine follow types of boil-water reactor plants.

Generally, the coordinated control system functions like the turbine follow control system until the initial loading mode of operation is completed. Thus, program control path 164 provides for reactor and/or turbine manual display. Path 166 provides for trimmed feedforward bypass control valve operation during reactor startup with the use of algorithms like those in blocks 108 and 110, and path 168 provides for trimmed feedforward bypass valve operation and turbine accelerating inlet valve operation during plant startup with the use of algorithms like those in blocks 118 through 124. In path 170, the turbine is initially loaded at constant reactor loading. During initial loading, turbine inlet valve demand and bumpless cutback in bypass valve demand are determined by algorithms like those described for blocks 134 and 136 in FIG. 3.

With bypass flow cutback to 10% of its maximum value and with satisfaction of any other interlock functions, block 172 initiates the coordinated control mode of plant operation. In this mode, reactor control is effected in response to frequency trimmed load demand $L_S$ in the manner described for FIG. 3, i.e. reactor control program blocks 174, 176, 178 and 180 in FIG. 4 correspond to the blocks 140, 142, 144 and 146 of FIG. 3.

As loading continues, bumpless withdrawal of initial pressure control from the bypass valves is completed by block 182. Thus, bypass valve position demand is based on a predetermined function of the turbine valve demand $f_1(D_I)$ multiplied by the throttle pressure correction $dP_O$. The function $f_1(D_I)$ includes a term which drops to zero after initiation of coordinated control and thereby enables turbine inlet valve demand to replace initial bypass valve demand in a smooth manner. In turn, turbine valve position demand $D_I$ equals the throttle pressure correction $dP_O$ times a predetermined feedforward linearizing characterization function of the bypass valve demand and the frequency trimmed load demand, i.e. $F_2(D_B, L_S)$. The term $L_S$ is the load demand L frequency correction $g \cdot ds$ as previously described. When $D_B$ equals zero in the block 182, block 184 directs program execution to path 186 which provides for the coordinated control mode of operation.

Under coordinated control, governor valve positioning is used to drive the turbine 14 directly to meet load demand subject to throttle pressure constraint. Simultaneously, reactor operation is varied to meet load demand so that the turbine operation can satisfy plant load demand within the throttle pressure constraints. Further detail on the application of coordinated control theory is presented in the aforementioned Podolsky application.

In turbine control program block 188, turbine valve positive demands $D_{IC}$ is determined as a feedforward linearizing characterization function of the speed or frequency trimmed load demand L, i.e. $f_2(L_S)$ which equals $f_2(D_B, L_S)$ when $D_B$ equals zero in the block 182. Feedback trim is applied to $D_{IC}$ in block 190 to correct for any error in the characterization and to apply throttle pressure constraint. Thus, the demand $D_{IC}$ is multiplied by load correction trim $dL_S$ and by throttle pressure trim $d_3P_O$.

The load feedback trim $dL_S$ provides for correcting any error in the feedforward characterization. It is determined by integrating the difference between the frequency trimmed load demand $L_S$ and a constant $K_3$ times the ratio of the impulse pressure $P_I$ to the throttle pressure $P_O$. Use of the load feedback ratio $P_I/P_O$ eliminates positive feedback action since a turbine valve position change made to satisfy in change in $P_I$ demand resulting from a change in the trimmed loads demand $L_S$ causes an opposite polarity change in the ratio.

To hold the throttle pressure at rated value or within a predetermined constraint range, the throttle pressure trim $d_3P_O$ is based on the throttle pressure error correction $dP_O$ which is determined as previously described. A setpoint adjustment is made in the setpoint term $(P_O)_{SP}$ in $dP_O$ as a predetermined function of the load error $(L_S - MW)$ in order to lower or raise the throttle pressure setpoint within limits and thereby prevent closing or opening of the turbine governor valves respectively on increases or decreases in load demand.

In block 192, the operations of the blocks 188 and 190 are repeated for a backup pressure control branch as in the case of FIG. 3. Block 196 then selects the lowest value of $D_I$ from the blocks 190 and 192.

The bypass valves are brought into operation by block 196 in the bypass valve control program under circumstances like those described for the block 160 in FIG. 3. Thus, the bypass valve demand $D_B$ is made equal to a predetermined linearizing characterization function of the turbine valve demand $D_I$ from the block 194. Block 198 then defines the individual turbine and bypass valve position demands on the basis of the total demands $D_I$ and $D_B$ in the manner already considered. The same block 198 functions similarly in the other modes of coordinated control system operation.

As a result of the coordinated control system functioning, better plant functioning is generally realized in relation to turbine follow plants and in relation to previously known coordinated control plants. Better accuracy and better plant dynamics stem from the implementation of feedforward control principles. As in the case of FIG. 3, comparatively better accuracy and flexibility of control are provided by computer system functioning.

The foregoing description has been presented only to illustrate the principles of the invention. Accordingly, it is desired that the invention not be limited by the embodiments described but rather that it be accorded an interpretation consistent with the scope and spirit of its broad principles.

What is claimed is:

1. A system for operating an electric power plant comprising a boiling water reactor and a steam turbine, a plurality of turbine inlet and bypass valves for controlling steam flow from said reactor to said turbine, an electric generator driven by said turbine, means for controlling the power level of said boiling water reactor to satisfy a plant electric load demand, means for determining the actual steam throttle pressure, means for determining in accordance with a predetermined characterization the total turbine valve position demand required to control a first controlled variable which is the throttle pressure variable or the turbine load variable during at least part of the turbine operating cycle, means for determining a representation of error between the actual throttle pressure and a setpoint throttle pressure, means for correctively modifying the turbine inlet valve position demand at least in accordance with the throttle pressure error representation and during at least part of the turbine operating cycle, means for determining a bypass valve position demand to control throttle pressure in a predetermined manner consistent with the turbine valve control, and means for operating said bypass and turbine inlet valves in accordance with the respective position demands.

2. A plant operating system as set forth in claim 1 wherein the first controlled variable is the throttle pressure during a turbine follow mode of operation, the throttle pressure error determining means develops an error representation including a reset term, and means are provided for preventing integral windup during turbine follow operation.

3. A plant operating system as set forth in claim 1 wherein said reactor controlling means operates to control correctively a predetermined reactor variable in accordance with a setpoint for that variable, said reactor controlling means determines in accordance with a predetermined characterization a setpoint demand for the reactor variable required to satisfy the plant load reference, means are provided for determining a representation of plant load error, and means are provided for correctively modifying the reactor setpoint demand in accordance with the load error representation.

4. A plant operating system as set forth in claim 1 wherein said determining and modifying means include a digital computer system, and means are provided for operating said computer system, to determine the throttle pressure error representation and the bypass valve position demand and the modified turbine valve position demand.

5. A plant operating system as set forth in claim 4 wherein the first controlled variable is the throttle pressure.

6. A plant operating system as set forth in claim 4 wherein the first controlled variable is the plant load, and said computer operating means is further operative to modify correctively the turbine valve position demand in accordance with a representation of load error determined from the plant load reference and a predetermined representation of turbine load.

7. A plant operating system as set forth in claim 1 wherein the first controlled variable is the throttle pressure during a turbine follow mode of operation, the throttle pressure error representation modifies the turbine valve position demand at least during the turbine follow mode of operation, the first controlled variable is a predetermined function of the plant load during an initial loading mode of operation, the bypass valve demand determining means provides throttle pressure control prior to initial loading and during initial loading, and means are provided for operating said turbine valve position demand determining means and said bypass valve demand determining means dependently from the load reference function to effect bumpless transfer from bypass control to turbine valve control of the throttle pressure as the plant load function is replaced by the throttle pressure during cross over from the initial loading mode of operation to the turbine follow mode of operation.

8. A plant operating system as set forth in claim 7 wherein said determining and modifying means and the last mentioned operating means include a digital computer system, and means are provided for operating said computer system, to determine the throttle pressure error representation and the bypass valve position demand and the turbine valve position demand during the initial and turbine follow modes of operation and during transfer therebetween.

9. A plant operating system as set forth in claim 1 wherein the bypass valve position demand is determined in accordance with a predetermined characterization defining bypass valve position required to satisfy an input demand quantity.

10. A plant operating system as set forth in claim 9 wherein said reactor controlling means operates to control correctively a predetermined reactor variable in accordance with a setpoint for that variable, said reactor controlling means determines in accordance with a predetermined characterization a setpoint demand for the reactor variable required to satisfy the plant load reference, means are provided for determining a representation of plant load error, and means are provided for correctively modifying the reactor setpoint demand in accordance with the load error representation.

11. A plant operating system as set forth in claim 10 wherein determining means and said modifying means and at least the setpoint demand determining part of said reactor controlling means include a digital computer system, and means are provided for operating said computer system to determine the throttle pressure error representation and the bypass valve position demand and the modified turbine valve position demand and the reactor setpoint demand.

12. A plant operating system as set forth in claim 1 wherein the first controlled variable is the plant load, and the turbine valve position demand is further correctively modified in accordance with a representation of load error determined from the plant load reference and a predetermined representation of turbine load.

13. A plant operating system as set forth in claim 12 wherein said reactor controlling means operates to control correctively a predetermined reactor variable in accordance with a setpoint for that variable, said reactor controlling means determines in accordance with a predetermined characterization a setpoint demand for the reactor variable required to satisfy the plant load reference, means are provided for determining a representation of plant load error, and means are provided for correctively modifying the reactor setpoint demand in accordance with the load error representation.

14. A plant operating system as set forth in claim 13 wherein the bypass valve position demand is determined in accordance with a predetermined characterization defining bypass valve position required to satisfy an input demand quantity.

15. A method for operating a boiling water reactor-steam turbine-electric generator plant provided with bypass valves and turbine inlet valves for controlling reactor outlet steam flow and turbine steam flow, the steps of said method comprising operating a control system to control the power level of the boiling water reactor to satisfy a plant electric load reference, operating the control system to determine the steam throttle pressure, operating the control system to determine in accordance with a predetermined characterization a turbine valve position demand required to control correctively a first controlled variable which is the throttle pressure variable or the turbine load variable during at least part of the turbine operating cycle, operating the control system to determine a throttle pressure error representation, operating the control system to modify correctively the turbine valve position demand in accordance with the throttle pressure error representation, operating the control system to determine a bypass valve position demand to control throttle pressure in a predetermined manner consistent with the turbine valve control step, and operating the inlet valves and bypass valves in accordance with the modified turbine valve position demand and the bypass valve position demand.

16. A plant operating method as set forth in claim 15 wherein the first controlled variable is the throttle pressure and the bypass valve position demand is determined in accordance with a predetermined characterization defining bypass valve position required to satisfy an input demand selected from a throttle pressure error demand and a demand based on pressure regulating capability of the turbine inlet valves.

17. A control system for operating an electric power plant having a boiling water reactor which supplies steam to a turbine-generator under bypass valve control and turbine inlet valve control, said system comprising means for controlling the power level of the boiling water reactor to satisfy a plant electric load demand, means for determining the actual steam throttle pressure, means for determining in accordance with a predetermined characterization the total turbine valve position demand required to control a first controlled variable which is the throttle pressure variable or the turbine load variable during at least part of the turbine operating cycle, means for determining a representation of error between the actual throttle pressure and a setpoint throttle pressure, means for correctively modifying the turbine inlet valve position demand at least in accordance with the throttle pressure error representation and during at least part of the turbine operating cycle, means for determining a bypass valve position demand to control throttle pressure in a predetermined manner consistent with the turbine valve control, and means for operating said bypass and turbine inlet valves in accordance with the respective position demands.

18. A control system as set forth in claim 17 wherein said determining and modifying means include a digital computer system, and means are provided for operating said computer system to determine the throttle pressure error representation and the bypass valve position demand and the modified turbine valve position demand.

19. A system for operating an electric power plant comprising a boiling water reactor and a steam turbine, a plurality of turbine inlet and bypass valves for controlling steam flow from said reactor to said turbine, an electric generator driven by said turbine, means for controlling the power level of said boiling water reactor to satisfy a plant electric load demand, means for determining the actual steam throttle pressure, a digital computer system, means for operating said computer system in response to the actual steam throttle pressure to determine a valve position demand for the turbine inlet valves and a valve position demand for the bypass valves during at least part of the turbine operating cycle, and means for operating said bypass and turbine inlet valves in accordance with the respective position demands.

20. A plant operating system as set forth in claim 19 wherein means are further provided for operating said computer system in response to an electric load reference and a determined representation of actual plant electric load to determine the demand for the reactor power level or both the reactor power level and the turbine inlet valve position demand level during at least part of the turbine operating cycle.

21. A plant operating system as set forth in claim 19 wherein means are further provided for operating said computer system to determine the bypass and steam inlet valve position demands during reactor startup and plant startup and turbine initial loading and plant load modes of operation and further to determine when each of the operation modes is in effect.

References Cited

UNITED STATES PATENTS

| | | | |
|---|---|---|---|
| 3,042,600 | 7/1962 | Brooks | 176—20 |
| 3,061,533 | 10/1962 | Shannon et al. | 176—56 |
| 3,097,488 | 7/1963 | Eggenberger et al. | 60—73 |
| 3,630,839 | 12/1971 | Podolsky | 176—20 |

OTHER REFERENCES

The Electrical World, May 7, 1962, McGraw-Hill Book Co., N.Y. (16 pp.).

REUBEN EPSTEIN, Primary Examiner

U.S. Cl. X.R.

176—20, 55; 60—73